United States Patent

Everett et al.

[11] Patent Number: 5,741,102
[45] Date of Patent: Apr. 21, 1998

[54] REMOVABLE QUASI-RATCHET FASTENER

[75] Inventors: Gerald W. Everett, Normal; Ralph R. Trimnell, Oak Park, both of Ill.

[73] Assignee: Everett Industries Inc.

[21] Appl. No.: 684,945

[22] Filed: Jul. 19, 1996

[51] Int. Cl.$^6$ .................. F16B 19/00; F16B 21/00
[52] U.S. Cl. .................. 411/339; 411/324; 411/510; 411/913
[58] Field of Search .................. 411/338, 339, 411/418, 419, 420, 508, 509, 510, 324, 913

[56] References Cited

U.S. PATENT DOCUMENTS

| | | | |
|---|---|---|---|
| 771,336 | 10/1904 | Thomson | 411/419 X |
| 1,638,165 | 8/1927 | Rau | 411/419 |
| 2,506,357 | 5/1950 | Hamilton | 411/339 X |
| 2,549,393 | 4/1951 | Siesel | 411/419 |
| 2,780,128 | 1/1957 | Rapata | |
| 3,115,804 | 12/1963 | Johnson | 411/339 X |
| 3,272,059 | 9/1966 | Lyday | |
| 3,619,477 | 11/1971 | Rasmussen | 174/66 |
| 3,810,279 | 5/1974 | Swick | 24/73 P |
| 3,860,999 | 1/1975 | Meyer | 411/510 |
| 3,908,235 | 9/1975 | Telliard | 24/73 P |
| 4,396,329 | 8/1983 | Wollar | 411/508 |
| 4,454,699 | 6/1984 | Strobl | 52/585 |
| 4,534,486 | 8/1985 | Eidson | 220/241 |
| 4,576,532 | 3/1986 | Hanson | 411/352 |
| 4,728,238 | 3/1988 | Chisholm | 411/510 |
| 4,867,725 | 9/1989 | Smith | 446/34 |
| 4,902,182 | 2/1990 | Lewis | 411/510 |

FOREIGN PATENT DOCUMENTS

| | | | |
|---|---|---|---|
| 1553594 | 10/1969 | Germany | 411/419 |
| 2261824 | 6/1974 | Germany | 411/339 |
| 2-97707 | 4/1990 | Japan | 411/510 |

*Primary Examiner*—Neill R. Wilson
*Attorney, Agent, or Firm*—Don Moyer

[57] ABSTRACT

The new fastener has a shank which is resiliently compressible along an axis perpendicular to the shank push-in axis and has teeth protruding from the shank along the axis of resilient compressibility. The teeth are inclined in the push-in direction and in the pull-out direction. When the shank is pushed into an existing screw hole, then inclines of teeth just past the far side of the screw hole are increased to resist motion in the pull-out direction so that the shank is secured in the screw hole and so that the fastener can be pulled-out without damage. The shank can be integrally part of a first structure being fastened to a second structure.

5 Claims, 1 Drawing Sheet

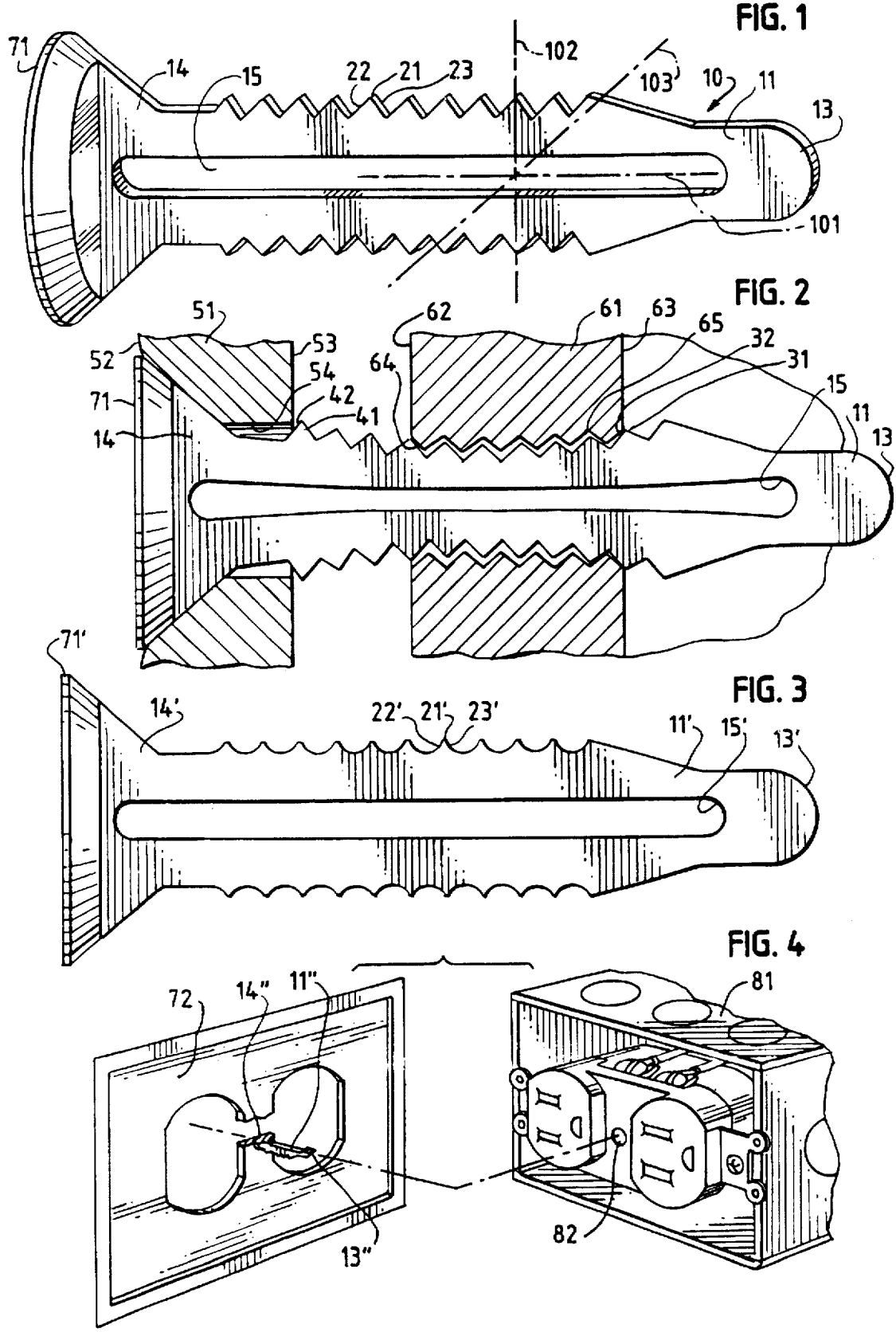

REMOVABLE QUASI-RATCHET FASTENER

BACKGROUND, OBJECTS, AND SUMMARY OF THE INVENTION

This invention is a fastener which can be pushed into standard threaded screw holes, which holds securely in part because resilient compression of the fastener increases inclines of teeth to oppose motion in the pull-out direction, and which can be pulled out without damage to the fastener or the screw hole.

There are many designs for fasteners which can be pushed through a first structure into a second structure in order to fix the first structure to the second structure. Rapata, in U.S. Pat. No. 2,780,128, shows a circular cross section fastener with barbs pointed toward the pull-out direction. Lyday, in U.S. Pat. No. 3,272,059, shows a fastener with barbs pointed toward the pull-out direction and with a hollow push-in end which allows the barbs to more greatly resist motion in the pull-out direction. Smith, in U.S. Pat. No. 4,867,725, and Strobl, in U.S. Pat. No. 4,454,699, show similar devices for special purposes. These devices are not designed to be removable without damage to the fastener or the structures being fastened.

Improvements in this type of fastener have been suggested in order to maximize forces opposing motion in the pull-out direction. Swick, in U.S. Pat. No. 3,810,279, shows a fastener having wings protruding perpendicularly from the shank arranged in a cruciform pattern around the cross section of the shank. Wollar, in U.S. Pat. No. 4,396,329, shows ribs added to Swick's wings. Chisholm, in U.S. Pat. No. 4,728,238, shows Swick's wings pointing more acutely in the pull-out direction to increase the forces opposing motion in the pull-out direction. Lewis, in U.S. Pat. No. 4,902,182, shows abutment stops between the wings to even more greatly increase the forces opposing motion in the pull-out direction. The object for all these push-in fastener improvements is to have maximum forces opposing motion in the pull out direction. These devices are not designed to be removed without damaging the fastener and the structures being fastened.

Some push-in fasteners have been designed so that they can be removed. Hanson, in U.S. Pat. 4,576,532, shows a fastener which holds very strongly and which can be easily undone when needed. However, it is necessary to have access to the pushed-in end of this fastener in order to undo the fastener. This is not feasible in most fastening applications.

There are a number of fastening applications where the ease of a push-in fastener is desirable, where it is also desirable to be able to remove the fastener without damaging the fastener or the fastened structures, and where it is not possible to access the pushed-in end of the fastener. For example, electrical and telecommunications outlet cover plates need to be secured to the outlet box and also need to be removable, without damage, for various reasons such as in order to make changes in the outlet boxes and to paint the surface containing the outlets.

Some attempts to address this are shown in the prior art. Rasmussen, in U.S. Pat. No. 3,619,477, shows special resilient studs on a special outlet cover plate which fit into special holes in specially designed outlet boxes. Telliard, in U.S. Pat. No. 3,908,235, shows an outlet cover push-in fastener which is removable by use of a special tool. The first device needs special new outlet boxes. The second device needs an easily lost, special tool for removal.

Eidson, in U.S. Pat. No. 4,534,486, shows various forms of an elastically biased metal prong which is attached to a special outlet cover and which can be inserted into the screw holes in the outlet. Adding this metal prong to cover plates accurately and securely enough would be expensive so that this design is not likely to be commercially successful. Also, because the forces securing this cover plate are limited, safety questions will arise.

Thus, there is an opportunity for a new fastener which can secure structures, such as securing a cover plate to an electrical or telecommunications outlet, which can be removed without special tools and without damage, which can work with existing products, which is easy to manufacture, and which is very low in cost.

Objects of this invention include the following. Make a fastener which can be pushed into a standard threaded screw hole for securing a first structure to a second structure, such as securing a cover plate to an electrical or telecommunications outlet box. Make a push-in fastener which can be pulled out from the screw hole without special tools and without damage to the fastener or the structures. Make a push-in, pull-out fastener so that the fastener can be incorporated as a monolithically integral part a first structure, such as a cover plate for electrical and telecommunications outlets. Make a push-in, pull-out fastener having teeth which protrude from the shank in a direction perpendicular to the push-in direction, which are inclined in the push-in direction, which are inclined in the pull-out direction, and which fit into the thread groves of a standard threaded screw hole. Make a toothed, push-in, pull-out fastener which is resiliently compressible toward the direction opposite to the direction toward which the teeth protrude so that the inclines of the teeth facing the pull-out direction just past the screw hole are increased by the resilient compression to form quasi-ratchet teeth. Make a removable quasi-ratchet fastener which is held in the screw hole by the force required to pull the quasi-ratchet teeth just past the screw hole into the screw hole, which is held in the screw hole by the elastic force required to compress the shank to pull teeth from the screw hole groves, and which is held in the screw hole by friction enhanced by the elastic force of the compressed shank.

In Summary, one embodiment of the new fastener has a shank which is resiliently compressible in a direction perpendicular to the push-in and pull-out direction and has teeth protruding from the shank along the axis of resilient compressibility, the teeth being inclined toward the push-in direction and being inclined toward the pull-out direction.

Other equivalent embodiments will be comprehended in the detailed description of the drawings, which will make additional equivalent embodiments hereafter obvious to people skilled in the art.

DETAILED DESCRIPTION OF THE INVENTION

In the drawings:

FIG. 1 shows the new fastener.

FIG. 2 shows the new fastener securing two structures and shows the quasi-ratchet action of the fastener teeth just past the second structure.

FIG. 3 shows an alternative form for the new fastener teeth.

FIG. 4 shows the new fastener as an integral part of a cover plate and shows how the new fastener can removably secure the cover plate to an electric outlet box.

The new fastener 10 is shown in FIG. 1. The fastener has a shank 11 which has three orthogonal axes: a long axis 101, a normal axis 102, and a lateral axis 103. The shank 11 has a push-in end 13 on the long axis, and has a pull-out end 14 on the long axis. There is a slot 15 through the shank along the shank lateral axis extending along the shank long axis between the push-in end and the pull-out end. Teeth 21 protrude from the shank along the normal axis. Each of the teeth have a pull-out incline 22 and a push-in incline 23. The shank is resiliently compressible along the normal axis, and the slot enhances the resilient compressibility of the shank. The shank shown in FIG. 1 has a cross section in the plane perpendicular to the long axis which is rectangular with the long side along the normal axis. Other equivalent forms for this cross section, with arcuate portions for example, which provide the same functions will be obvious hereafter to people skilled in the art. Similiarly, other equivalent forms for the slot 15, including opening the slot out of the push-in end, will also be obvious hereafter to people skilled in the art.

Functions of the new fastener are best seen in FIG. 2 where the new fastener is shown securing a first structure 51 to a second structure 61. The first structure has an outer side 52, an inner side 53, and an opening 54 from the outer side through to the inner side. The second structure has a near side 62, a far side 63, and an opening 64 from the near side through to the far side. The opening 64 in the second structure is shown to be threaded with thread groves 65. Here one 31 of the teeth is just past the far side 63 of the second structure.

Because the shank 11 is resiliently compressed by the opening 64 in the second structure, the pull-out incline 32 of the tooth 31 is increased toward being perpendicular to the shank long axis. This quasi-ratchet tooth thus resists motion of the shank toward the pull-out direction. Motion toward the pull-out direction in this threaded opening is also resisted by the force needed to further compress the shank so that the teeth in the thread groves can ride up their pull-out inclines as the shank is pulled out. Also, motion toward the pull out direction is resisted by friction with the opening which is enhanced by the elastic force of the resiliently compressed shank.

However, unlike a true ratchet—and unlike the various barbs, wings, and other devices which have been used in the art—this quasi-ratchet fastener is designed so that it can be pulled out without damaging the fastener or the structures being secured. The new fastener is designed so that force needed to move the fastener toward the pull-out direction is great enough to secure structures, such as securing a cover plate to a telecommunications or electrical outlet box, in normal use. The new fastener is also designed so that there is enough pull-out incline 32 left at a quasi-ratchet tooth 31 and enough compressibility left in the shank 11 so that the fastener can be pulled out without damaging the fastener or the structures.

In FIG. 1 the pull-out incline 22 and the push-in incline 23 of the teeth 21 are shown to be planar. Other forms can provide the same functions. For example, FIG. 3 shows a shank 11' having a push-in end 13', a pull-out end 14', and a slot 15' all generally identical to their counterparts in FIG. 1, but has teeth 21' which have a pull-out incline 22' and a push-in incline 23' both of which are arcuate.

The new fastener is designed to work with existing structures, such as securing a standard cover plate to a standard telecommunications or electrical outlet box. Thus the new fastener works with threaded openings like the opening 64 in the second structure 61 shown in FIG. 2. The new fastener will also work with openings which are not threaded inasmuch as the opening compresses the shank 11 enough to increase the pull-out incline 32 of a quasi-ratchet tooth 31, and the resilient compression of the shank increases friction, to oppose motion sufficiently in the pull out direction. The new fastener will also work when the fastener does not go all the way through the threaded opening in the second structure inasmuch as the force needed to further compress the shank so that the teeth in the thread groves can ride up their pull-out inclines as the shank is pulled out, and friction with the opening which is enhanced by the elastic force of the resiliently compressed shank, together sufficiently oppose motion in the pull-out direction Often it is desirable to have a fastener secured in a first structure just enough so that the fastener does not fall away as the first structure is positioned for being secured to a second structure. In FIG. 2 it can be seen that motion of the shank in the pull-out direction into the opening 54 in the first structure 51 can be resisted by the force required to further compress the shank in order to pull the pull-out incline 42 of one 41 of the teeth just past the inner side 53 of the first structure into the opening 54.

The pull-out inclines 22, and alternatively 22', are shown to be generally equal to the push-in inclines 23, and alternatively 23', but they need not be the same. The slopes of the pull-out inclines can be different from the slopes of the push-in inclines. The pull-out and push-in inclines can vary in slope, and can vary in planar or arcuate form, from one to another of the teeth. For example, the pull-out inclines of those of the teeth which are closest to the pull-out end can be increased to facilitate securing the fastener in a first structure just enough so that it does not fall away as the first structure is positioned for being secured to a second structure.

The shank pull-out end 14 and 14' can terminate with a head 71 and 71' in order to stop motion of the shank through the opening 54 through the first structure, so that the first structure 51 can be secured to the second structure 61, as can be seen in FIG. 2. In addition, this shank is deliberately devised so that the shank can be pulled out without damage with the intention of making the shank a monolithically integral part of a first structure. This is shown in FIG. 4. Here the shank 11" pull-out end 14" is a monolithically integral part of a cover plate 72 for an outlet box 81. The shank push-in end 13" can be inserted into the existing screw hole 82 in the existing outlet box 81. Thus the shank secures the cover plate to existing outlet boxes so that the cover plate can be removed without damage to the outlet box or damage to the cover plate or damage to the monolithic fastener shank. This saves steps in work with cover plates and the saved steps will accumulate to large savings in time and cost. Making the cover plate and fastener shank as one part of the same material also saves costs. And, this cover plate with this monolithic fastener would have an outer side unencumbered by the usual screw head, which offers greater opportunities for ornamental designs on the cover plate. Other equivalent forms wherein this new removable push-in fastener is an integral part of a first structure 51 in order to secure the first structure to a second structure 61 so that the first structure can be removed from the second structure without damage to the second structure or damage to the first structure, including the fastener shank, will be obvious hereafter to people skilled in the art.

Other equivalent forms for the resiliently compressible shank and teeth will be obvious hereafter to people skilled in the art. It is understood therefore that this invention is not limited to the particular examples illustrated here.

We claim:

1. A fastener comprising:

a shank, the shank having a long axis, a lateral axis, and a normal axis, the shank having a push-in end on the shank long axis the shank having a pull-out end on the shank long axis, and the shank being compressible along the normal axis and the shank having an elastic force acting along the normal axis caused by compression of the shank along the normal axis; and teeth, the teeth protruding from the shank along the shank normal axis, each one of the teeth having a push-in incline, and each one of the teeth having a pull-out incline, the push-in incline causing a compression of the shank while the shank is being inserted from a first structure into an opening in a second structure, the compression allowing the shank to be fully inserted from the first structure into the opening without any rotation of the shank, the teeth fitting into screw thread grooves in the second structure while the shank remains fully inserted in the second structure, the teeth causing a continuing compression of the shank while the shank remains fully inserted in the second structure, the elastic force caused by the continuing compression resisting motion in the pull-out direction, the elastic force caused by the continuing compression increasing the pull-out incline of at least one of the teeth which is just through the opening in the second structure, the increased pull-out incline resisting motion out of the opening, the increased pull-out incline and the shank compressibility allowing the shank to be pulled out of the opening without damage to any of the shank, the teeth, and the second structure.

2. The fastener of claim 1 wherein the shank is integrally part of the first structure.

3. The fastener of claim 2 further comprising a slot through the shank along the shank lateral axis and extending along the shank long axis between the shank pull-out end and the shank push-in end, the slot for increasing the distance that the shank can be compressed along the shank normal axis.

4. The fastener of claim 1 wherein the shank pull-out end terminates with a head, the head for stopping motion of the shank through the first structure.

5. The fastener of claim 4 further comprising a slot through the shank along the shank lateral axis and extending along the shank long axis between the shank pull-out end and the shank push-in end, the slot for increasing the distance that the shank can be compressed along the shank normal axis.

* * * * *